Nov. 22, 1932.    A. J. KERCHER    1,888,860
COMPRESSOR
Filed July 18, 1927    2 Sheets-Sheet 1

INVENTOR
Arthur J. Kercher
BY
White, Prost & Fryer
ATTORNEYS

Nov. 22, 1932.   A. J. KERCHER   1,888,860
COMPRESSOR
Filed July 18, 1927    2 Sheets-Sheet 2

INVENTOR
*Arthur J. Kercher*
BY
*White, Prost & Fryer*
ATTORNEYS

Patented Nov. 22, 1932

1,888,860

UNITED STATES PATENT OFFICE

ARTHUR J. KERCHER, OF BERKELEY, CALIFORNIA

COMPRESSOR

Application filed July 16, 1927. Serial No. 206,441.

This invention relates generally to devices commonly known as compressors, which are utilized for compressing or evacuating gases.

In the design of fluid compressors, the most important factors to consider are cheapness and ease of manufacture, operating efficiency and freedom from servicing, and quietness of operation. In the past, compressors of the reciprocating piston type have utilized connecting rods, piston pins, and other parts which required accurate machining in order to make efficient operation possible. A multiplicity of closely machined parts not only increases the cost of manufacture, but also makes necessary more frequent servicing when such a compressor is in operation. Because of improper balancing of the moving parts, such compressors have also been noisy in operation and subject to much vibration, especially after the parts had become worn.

It is an object of this invention to devise an efficient compressor having a minimum number of parts and which may be cheaply manufactured.

It is a further object of this invention to devise a compressor which will operate practically noiselessly but in which the parts may be fitted together with comparatively large tolerances and without accurate alinement.

It is a further object of this invention to devise a compressor which is provided with inherent means whereby the parts may be set into motion with substantially no initial torque.

It is a further object of this invention to devise a machine which will combine the functions of a compressor with the function of an oil separator.

It is another object of this invention to devise a novel form of motor compressor unit which is inclosed within a sealed housing.

Further objects of this invention will appear from the following description in which I have set forth the preferred embodiment of my invention. It is to be understood that the appended claims are to be accorded a range of equivalents consistent with the state of the prior art.

Referring to the drawings.

Figure 1:
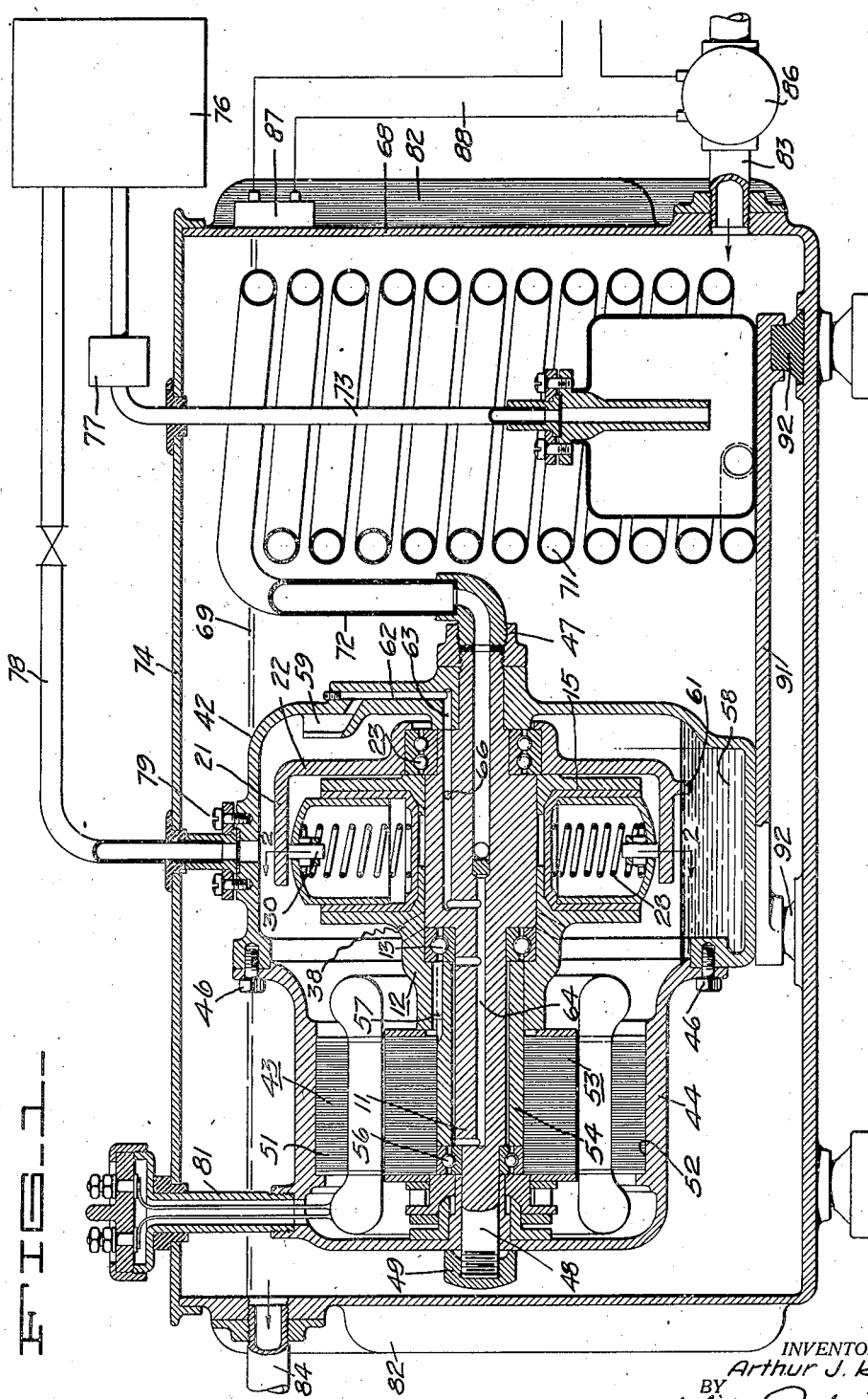
Figure 1 is a side elevational view shown in cross section, and illustrating the invention incorporated with a refrigerating system.

Referring to the drawings, the preferred form of this invention which I have illustrated comprises a pair of relatively rotatable members 11 and 12, the member 11 forming a shaft, while the member 12 forms a cylinder structure. Shaft 11 preferably remains stationary while the cylinder structure 12 is journaled upon and rotates about the shaft. To minimize friction the cylinder structure 12 has been shown as journaled by means of the ball bearing assembly 13. The cylinder structure 12 is provided with a plurality of cylinder bores 15 which are arranged substantially radial with respect to the axis of rotation. In the drawings I have shown four cylinder bores, although it is obvious that any number may be employed depending upon the capacity of the compressor desired. Slidably fitted within each of the cylinder bores 15 there is a piston structure 16 which preferably includes a piston element 17, said element comprising a sleeve 18 adapted to fit the walls of the cylinder bores 15, and a piston head 19.

For effecting reciprocating movement of the piston structures, there is provided an actuating member arranged eccentrically with respect to the axis of rotation of the cylinder 12. For simplicity this member is preferably in the form of a cylindrical ring 21 formed as a flange upon a disc 22. Disc 22 is arranged to rotate about an axis parallel to but eccentric with respect to the axis of rotation of cylinder structure 12, and for this purpose I have shown the ball bearing assembly 23. The inner periphery of the ring 21 has direct abutting contact with the piston structures and thereby causes the pistons to reciprocate as the cylinder structure is rotated about the stationary shaft. However as an added feature of this invention I have provided resilient means cooperating between the inner periphery of ring 21 and each of the piston elements 17, whereby the piston elements are rendered inoperable to reciprocate until the cylinder structure has been rotated above a given minimum speed. Thus each piston is provided with a motion transmitting member 24 slidably disposed with respect to the same, this member comprising for example a sleeve 26 slidably disposed with the sleeve 18 of the corresponding piston, and an end portion 27 adapted to engage the inner periphery of the ring 21. Disposed within the piston structure, there is a compression spring 28, one end of which is seated upon the inner face of the piston head 19, and the other end which is seated upon the inner face of the end portion 27. This spring serves to normally urge the piston 17 and the actuating members 24 apart so that when the cylinder structure 12 is stationary with respect to the shaft 11, the end portion 27 is urged toward the inner periphery of ring 21, while the piston 17 is urged inwardly to the limit of its movement in the cylinder bore 15.

As the cylinder structure is rotated, it carries with it the ring 21 and because of the eccentric relationship of this ring with the axis of rotation of the cylinder structure, the members 24 are caused to reciprocate with respect to the cylinder structure. As long as the speed of rotation is relatively slow, centrifugal force is not sufficient to cause the piston elements 17 to overcome the force of the compression springs 28, and for this reason the pistons will remain relatively stationary in their respective cylinder bores. As the speed of rotation is increased however, as during starting of the compressor, the centrifugal force upon the pistons will also increase until sufficient to overcome the force of compression springs 28, and the pistons are then forced outwardly into abutting contact with motion transmitting members 24, and are thereafter caused to reciprocate togethere with these members.

In order to provide a positive limit to the outward movement of each of pistons 17, I preferably provide these pistons with an inner annular shoulder 29, adapted to be pressed in abutting contact with the inner end of sleeve 26. Altho the ring 21 is freely rotatable, and is therefore rotated together with the cylinder structure 12, a certain amount of relative movement will occur between each of the actuating members 24 and the inner peripheral surface of ring 21. In order to minimize friction which might be caused by such relative movement, I preferably provide rollers 30 which are journaled upon the end portions 27 of each of the members 24, these rollers serving to provide a frictionless engagement with the ring 21.

The valve mechanism for the compressor is preferably formed as a part of the shaft 11. Thus a portion of the shaft which is within the cylinder structure 12, is preferably enlarged to provide a valve portion 31 adapted to snugly fit the inner bore 32 of the cylinder structure. Each of the compressor cylinders is provided with a port 33 which is adapted to cooperate with a plurality of passages provided in the valve portion 31, these passages being shown in detail in Figures 2 and 3. Formed in the periphery of the valve portion 31 are the recesses 36 and 37 which form respectively intake and discharge ports adapted to register successively with the ports 33. The recess 36 is likewise adapted to communicate with the intake passages 38 which are preferably arranged radially in the cylinder structure 12. Discharge port 37 communicates with passages 39 and 41 in the stationary pipe 11 for the discharge of compressed fluid.

Figure 2:
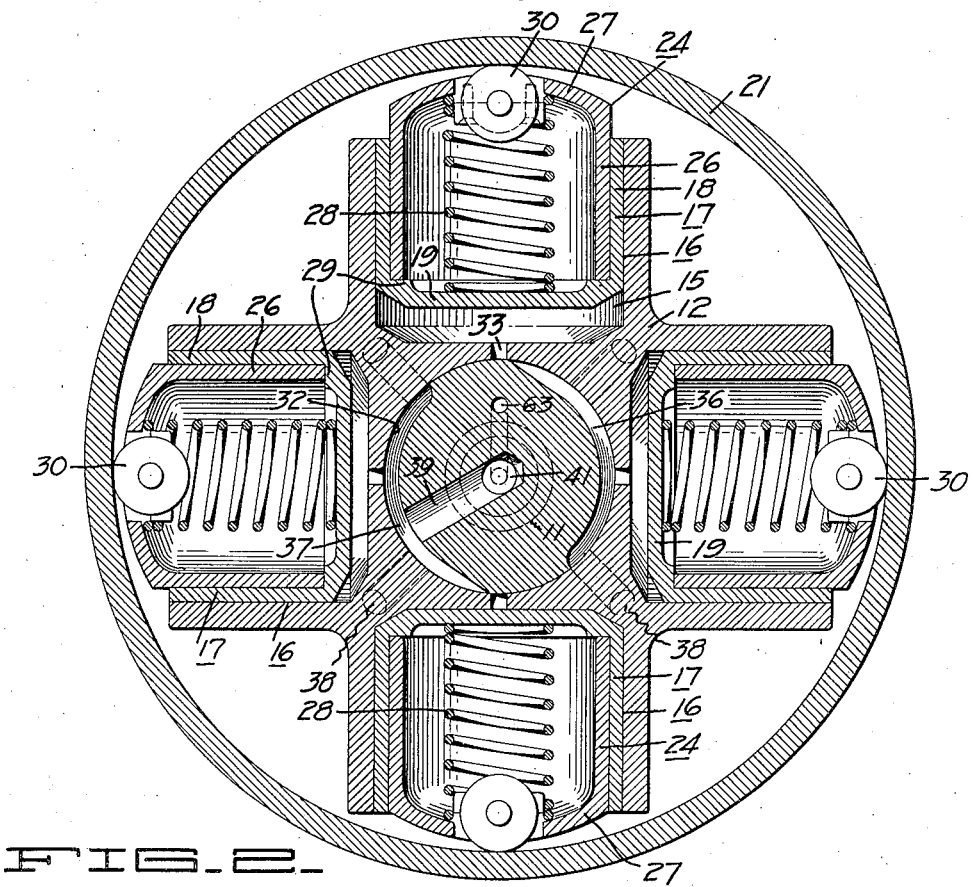
Fig. 2 is a cross sectional view taken along the line 2—2 of Fig. 1.
Figure 3:
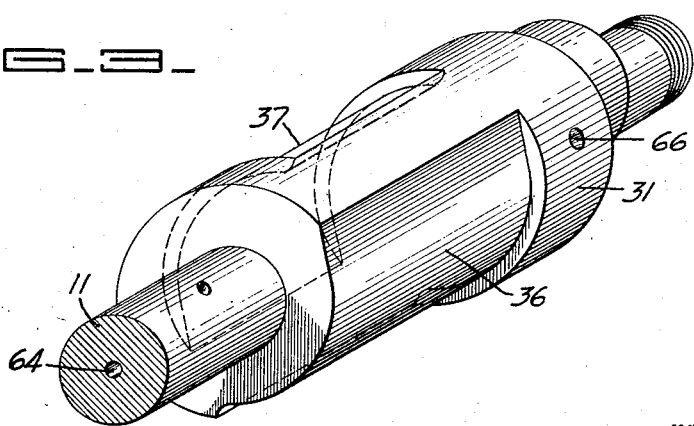
Fig. 3 is a detail illustrating a portion of the compressor shaft.

To explain the operation of the valve mechanism it will be presumed that the compressor is operating at sufficient speed to cause the pistons to reciprocate. Referring now to Fig. 2, and tracing the cycle of operation of the bottom piston, as this piston rotates in a counterclockwise direction about the stationary shaft, it is first caused to move outwardly in the cylinder bore, and is placed in communication with the port 36, which is in communication with one of the radial intake passages 38. Gas is then permitted to enter this cylinder until the piston reaches the limit of its outer movement which will be at the position one-half way about the stationary shaft. Completing the remainder of its revolution, communication between port 36 and that cylinder will be cut off and communication will be established with the discharge port 37. The piston will likewise be moved inwardly to press and force the gas thru ports 33, 37 and passages 39 and 41.

Any convenient means of mounting may be employed for the compressor described above, however for certain reasons I prefer to enclose and mount the compressor within a suitable sealed metal housing 42. This housing also preferably encloses an electrical motor 43 which may be directly connected to drive the compressor. In the particular construction shown the housing 42 is formed of two parts, one enclosing the compressor and the other part 44 forming the housing for the motor 43, these two housing parts being suitably secured together as by means of cap screws 46. The motor shaft in this instance is secured at its ends to the ends of the housing 42, one end of the shaft being provided with a suitable fitting 47 for making connection with the fluid discharge passage 41. The other end of shaft 11 is provided with a portion 48 which is extended thru the head of motor housing 44 and provided at its external end with a suitable cap or nut 49. By removing the cap 49 and cap screws 46, the motor housing 44 may be removed from the remainder of the compressor housing to permit repairs to be made to the motor or to the compressor.

Any standard form of electric motor may be employed, altho I prefer to utilize a motor having a stator 51 of which the laminations have a pressed or forced fit into the inner bore 52 of the motor housing 44. The rotor 53 of the motor is preferably mounted upon a hollow rotatable shaft 54 which is disposed about the stationary shaft 11. This hollow shaft is journaled as by means of the ball bearing assembly 56 and one end of the same is directly coupled to drive the compressor cylinder assembly 12, as by means of the key connection 57.

The housing 42 preferably forms a reservoir 58 for containing oil to be used in lubricating the compressor. The compressor shaft is provided with passages for conducting oil to the various bearings and moving parts, and in lieu of the usual pump for carrying the oil to these parts, I provide an oil reservoir 59 upon the inner face of the end of housing 42, and this reservoir is adapted to catch a certain amount of the oil thrown from the rotating ring 21. To provide more positive introduction of oil into the reservoir 59, the periphery of ring 21 may be provided with one or more splash lugs 61 adapted to dip into the oil provided in reservoir 58. During operation a spray is thus thrown from the ring 21 and part of the oil which runs down the inside of the housing is collected by reservoir 59 and conducted down thru passageway 62, and thence to the oil passages 63 and 64 in the shaft 11 which lead to the ball bearing assemblies 13 and 56. By means of an oil duct 66 communicating with passage 63 and the periphery of the valve portion 31, oil is provided for lubricating the engaging portions of the valve portion and the cylinder structure, and also a certain amount of oil is introduced into the cylinder bores thru ports 33 to lubricate the pistons. In fact an excess of lubricant is provided for the pistons so that these pistons may have a relatively loose fit within their cylinder bores without having excessive leakage.

By virtue of the centrifugal force developed when the cylinder structure is in rotation, oil is prevented from passing into the discharge passage 41 and is all caused to move in an outwardly direction. Likewise because of the radial positioning of the intake passages 38, and as these passages are rotated, a centrifuge action is developed upon the fluid being taken into the compressor which is sufficient to effect centrifugal separation of oil therefrom. This action of the compressor to effect a separation of oil from the gas, is valuable in many instances. For example when the compressor is utilized in a refrigerating system, as has been illustrated in the drawings, it makes it possible to dispense with an oil separator which is usually provided in addition to the compressor. The particular means which I have disclosed for introducing oil into the compressor is of advantage in that it prevents introduction of oil when the compressor is being rotated at relatively slow speed, as in starting or stopping. If oil were introduced at this time the centrifugal action would not be sufficient to effect its separation from the gas being pumped. The provision of splash means for introducing oil in the reservoir 59 makes it impossible for oil to be introduced when the compressor is initially starting, as the splashing effect is then insufficient to throw the oil from the lugs 61 to the inner surfaces of housing 42 which are adjacent to the reservoir 59.

In many instances it is desirable to entirely suppress even the small amount of noise and vibration occasioned by operation of a compressor such as described above. I have found that this may be accomplished by immersing the motor compressor unit in a non-compressible fluid such as water or oil. For this purpose I have shown a metal container 68 filled with a suitable non-compressible fluid 69 such as water or oil which entirely immerses the housing 42 of the compressor. Where the compressor is utilized in a refrigerating system a suitable condenser 71 may also be immersed in the liquid 69, and this liquid employed for absorbing the heat from the same. The intake pipe 72 of this condenser is shown as connected with the fitting 47 of the compressor, and outlet pipe 73 of the condenser leads up thru the cover 74 and communicates with a suitable heat absorber 76. A suitable automatic control valve 77 may be inserted between the condenser and the heat absorber 76. From the heat absorber the expanded refrigerant fluid is returned to the compressor thru pipe 78, this pipe having a suitable connection 79 with the compressor housing 42, whereby it communicates with the interior of the housing. The electrical terminal wires for the motor may be extended up thru the cover 74, within a suitable sealed metal conduit 81. For dissipating heat absorbed by the liquid from the compressor housing and from the condenser 71, the exterior of the container 68 is preferably provided with a plurality of cooling fins 82. As additional means for maintaining the liquid relatively cool, pipes 83 and 84 may be provided for the introduction of cool and the removal of heated liquid. The introduction of cool liquid may be controlled as by means of a valve 86 automatically actuated in accordance with a thermostat 87 which is in thermal contact with the liquid within the container. Thermostat 87 is electrically connected to control valve 86 as by means of the electrical circuit 88. To minimize transfer of vibration thru the mounting of the compressor within the container 68, the compressor housing 42 and the condenser 71 are preferably secured to a suitable common base 91 which is supported by the bottom of container 68 upon a plurality of rubber blocks 92. In place of the rubber blocks it is obvious that other resilient means may be employed such as springs for suspending the compressor. The refrigerating system herein disclosed is claimed in my application No. 159,033, filed January 5, 1927, altho it may be briefly explained that in operation it utilizes a suitable refrigerant fluid such as sulphur dioxide or ethyl chloride, which is compressed and discharged into the condenser 71. The condensed liquid refrigerant is then permitted to expand under reduced pressure in the heat absorber 76 and the expanded fluid is then returned to the compressor. The valve 86 functions to introduce cool liquid in accordance with the temperature of the liquid within the container. If the fins 82 are insufficient to carry away the heat absorbed by the liquid, due to high temperature of the surrounding air, then thermostat 87 automatically controls valve 86 to introduce additional cool liquid.

It is obvious from the above description that I have provided a compressor of great utility which will be efficient in operation and cheap to manufacture. The use of the ring 21 dispenses with the necessity of connecting rods, cranks and piston pins, and makes the compressor very simple to assemble in manufacture. This ring can be cheaply constructed as an integral part of the disc 22, by pressing the same from a sheet of metal. The use of this ring also makes it possible to have the pistons slightly disalined with respect to each other or to the axis of rotation. Thus the machining of the parts of the compressor may be done by automatic machinery without regard to extreme accuracy, without however sacrificing the efficiency of the finished machine. Because of the efficient lubrication provided, I have been able to dispense with the use of piston rings. When employed in a refrigerating system, all oil will be separated from the refrigerant and will not be carried over into the condenser or heat absorber. The use of rollers 30 not only minimizes friction between the piston structures and ring 21 but also tend to further reduce the starting torque, since ring 21 may initially remain stationary while the cylinder structure is started into rotation.

I claim:

1. In a pump the combination of a stationary shaft, a piston and cylinder assembly mounted to rotate about the shaft, an actuator rotatably mounted eccentrically with respect to the shaft for effecting reciprocatory movement of the pistons, a reservoir from which oil flows by gravity into the compressor, and means operable upon rotation of said assembly to introduce oil into the reservoir.

2. In a pump, the combination of a stationary shaft, a piston and cylinder assembly mounted to rotate about the shaft, an actuator rotatably mounted eccentrically with respect to the shaft for effecting reciprocatory movement of the pistons, a reservoir from which oil flows by gravity into the compressor, an oil bath into which the actuator is adapted to dip during its rotation, and means for causing oil spray from the actuator to be introduced into the reservoir.

3. In a fluid compressor, comprising stationary and rotatable members having intake and discharge passages, and means for subjecting external parts of said members to a spray of oil, the intake passage extending radially through one of the rotatable members whereby centrifugal force will effect a separation of the oil from the fluid being compressed.

4. In a compressor, a pair of members relatively rotatable with respect to each other, one of said members comprising a shaft and the other comprising a cylinder structure, a piston disposed in said cylinder structure, and means for effecting reciprocation of said piston only as the speed of rotation between said members is increased above a given value.

5. In a compressor, a pair of members relatively rotatable with respect to each other, one of said members comprising a shaft and the other comprising a cylinder structure, a piston disposed in said cylinder structure, means for reciprocating said piston upon relative rotation between said members, and means for rendering said first named means inoperative for reciprocating the piston during initial starting movement between said members.

6. In a compressor, a pair of relatively rotatable members, one of which constitutes a stationary shaft and the other of which constitutes a cylinder structure movable about the shaft, a piston cooperating with said structure and rotatable therewith, means for reciprocating said piston with respect to said cylinder structure upon relative rotation between said members, and means for rendering said first named means inoperative for reciprocating the piston during initial starting rotation between said members.

7. In a compressor, a pair of relatively rotatable members, one of which constitutes a stationary shaft and the other of which constitutes a cylinder structure movable about the shaft, a piston cooperating with said structure and rotatable therewith, means for reciprocating said piston with respect to said cylinder structure upon relative rotation between said members, and means for effecting a substantially zero starting torque for initial starting movement between said members.

8. In a compressor, a pair of relatively rotatable members, one of which constitutes a stationary shaft and the other of which constitutes a rotatable cylinder structure, a piston cooperatively associated with the cylinder structure and adapted to reciprocate in a general direction radial to the axis of rotation of said cylinder structure, means for effecting reciprocation of the piston upon rotation of the cylinder structure, and resilient means interposed between the piston and said first named means for urging said piston toward said axis of rotation.

9. In a compressor, a pair of relatively rotatable members, one of which constitutes a stationary shaft and the other of which constitutes a rotatable cylinder structure, a piston cooperatively associated with the cylinder structure and adapted to reciprocate in a general direction radial to the axis of rotation of said cylinder structure, means rotatable eccentrically with respect to the axis of rotation of the cylinder structure for effecting reciprocation of said piston, and a spring interposed between said piston and said first named means.

10. In a compressor, a pair of members movable relative to each other for performing work upon an elastic medium, one of said members having ports for ingress and egress of said medium, valve means permanently operative to control flow of the medium thru said ports, and means whereby the work performed upon said medium is kept substantially negligible for initial starting movements between said members.

11. In a compressor, a housing, a piston and cylinder assembly and an actuator therefor disposed within said housing, said actuator comprising a ring shaped flange extending about said assembly leaving parts of said assembly exposed to the interior of said housing, whereby oil splashed within the housing has access to said assembly.

12. In a compressor, the combination of a relatively stationary shaft, a piston and cylinder assembly rotatable about said shaft, a freely rotatable ring surrounding said assembly and serving as a means for effecting reciprocation of the cylinders, said ring being free to rotate independently of said assembly, a casing enclosing said compressor, and means for maintaining a spray of lubricant within the casing, said ring being supported to expose a substantial portion of said assembly to said spray.

13. In an apparatus of the class described, a fluid compressor, a shaft and a cylinder assembly disposed about said shaft and rotatable relative to the same in said compressor, a casing for said compressor having a quantity of oil disposed therein, an intake and an outlet for said compressor, means for effecting separation of oil from compressible fluid and means for restraining passage of fluid through said compressor until the rate of rotation of said cylinder assembly exceeds a definite value.

14. In a fluid compressor, the combination of a shaft, a cylinder assembly disposed about said shaft and rotatable relative to the same, a casing for said compressor, said compressor having an intake communicating with the interior of said casing, a discharge port, means adapted to spray oil disposed within the casing upon the exterior of the compressor during operation of the compressor, said oil being separated by centrifugal force from compressible fluid and means for restraining discharge of fluid thru said discharge port until the rate of rotation of said cylinder assembly relative to said shaft exceeds a definite value.

15. In a compressor, a shaft and a cylinder structure, said cylinder structure being rotatable relative to said shaft, and piston means disposed in said cylinder structure for effecting pumping of fluid only when the speed of rotation of said cylinder structure has increased above a given value, said means including a pair of relatively movable members and resilient means for normally urging said members apart.

16. In a compressor, a shaft and a cylinder structure, said cylinder structure being rotatable relative to said shaft, and piston means disposed in said cylinder structure for effecting pumping of fluid only when the speed of rotation of said cylinder structure has increased above a given value, said means including a pair of interfitting members, and means for normally urging said members apart.

17. In a compressor, a shaft and a cylinder structure rotatable about said shaft, piston means disposed in said structure, and means for actuating said piston means as said structure is rotated, said piston means including one part adapted to be engaged by and actuated by said actuating means, and another part relatively movable with respect to said parts, said parts being positioned to be urged together by centrifugal force, and resilient means normally tending to extend said parts from each other.

18. In a fluid compressor, a piston for compressing a fluid, means for actuating said piston, and resilient means operable upon the attainment of a momentum by the piston exceeding the momentum of the piston at the initial starting movement thereof for rendering said piston operative to compress the fluid.

19. In a fluid compressor, a piston for compressing a fluid, means for actuating said piston, and resilient means operable before the attainment of a predetermined amount of momentum by the piston for rendering said piston inoperative to compress the fluid, whereby the work performed by said piston is kept negligible during the initial starting movement thereof.

In testimony whereof, I have hereunto set my hand.

ARTHUR J. KERCHER.